United States Patent
Saiz

(10) Patent No.: US 6,220,551 B1
(45) Date of Patent: Apr. 24, 2001

(54) FLIGHT CONTROLS WITH AUTOMATIC BALANCE

(76) Inventor: Manuel Munoz Saiz, San Emilio 16, 1, 3, 28017 Madrid (ES)

( * ) Notice: Subject to any disclaimer, the term of this patent is extended or adjusted under 35 U.S.C. 154(b) by 0 days.

(21) Appl. No.: 09/139,524

(22) Filed: Aug. 25, 1998

Related U.S. Application Data

(63) Continuation-in-part of application No. 09/110,744, filed on Jul. 2, 1998.

(30) Foreign Application Priority Data

Jan. 14, 1998 (ES) .................................................... 9800049
Jan. 14, 1998 (ES) .................................................... 9800050

(51) Int. Cl.[7] .................................................................. B64C 9/00
(52) U.S. Cl. ............................ 244/217; 244/90 R; 244/89
(58) Field of Search .................................... 244/217, 214, 244/215, 213, 90 R, 88, 89

(56) References Cited

U.S. PATENT DOCUMENTS

| 3,987,984 | * | 10/1976 | Fischer | 244/44 |
| 3,994,452 | * | 11/1976 | Cole | 244/44 |
| 4,053,124 | * | 10/1977 | Cole | 244/219 |
| 5,794,893 | * | 8/1998 | Diller et al. | 246/213 |

* cited by examiner

Primary Examiner—Robert P. Swiatek
(74) Attorney, Agent, or Firm—Robert M. Schwartz

(57) ABSTRACT

Flight controls with automatic balance for use in controlling the movement of an aircraft through a fluid system, the control system includes ailerons divided into two parts, which at lower speed adopt the shape of a conventional aileron and rotate in their entirety with the same degree, and at high speeds a first part of the flap rotates or extends to a determinated angle by an actuator while the second part of the aileron, which is hinged or articulated to the first part of the aileron, rotates with reference to the main part, where the amount of rotation is a function of the air speed pressure, and one or more springs oppose the rotation caused by air speed pressure.

13 Claims, 1 Drawing Sheet

FLIGHT CONTROLS WITH AUTOMATIC BALANCE

CROSS-REFERENCES TO RELATED APPLICATIONS

This application is a continuation-in-part of application Ser. No. 09/110,744, filed Jul. 2, 1998.

This application claims the priority date of Spanish Patent Application No. P9800050 filed on Jan. 14, 1998, and Spanish Patent Application No. P9800049 filed on Jan. 14, 1998. The basis for priority in this case is the Paris Convention for the Protection of Industrial Property (613 O.G. 23, 53 Stat 1748). The Spanish patent application was filed in The Official Patent and Trademark Office of Spain.

BACKGROUND OF THE INVENTION

1. Field of Invention

This invention relates to a flight control system for use in an aircraft which compensates aerodynamically for the amount of deflection required to provide such a control in response to the variations in airspeed or fluid pressure.

2. Brief Description of the Prior Art

Aircraft flight controls take the form of primary and secondary surfaces which are hinged to the trailing or aft portion of directional, horizontal stabilizer members, and wings on the aircraft. Said members may include ailerons, elevators, rudders, and flaps. The pneumatic or electric system which are operated by the pilot or autopilot, by means of one or two actuators but in most of these systems are used two one piece ailerons or surfaces. One actuator operates always and the other only acts at low speed. Otherwise, the flaps' extension is changed as a function of the airspeed; it is reduced as the airspeed increases. Other like flaps are acted manually by steps or stages. In all cases, the deflection is increased as the airspeed decreases.

SUMMARY OF THE INVENTION

The present invention includes flight controls with automatic balance that control the movement of an aircraft through a fluid system. Said control system comprises ailerons divided into two parts, which at low speed adopt the shape of a conventional aileron and rotate in their entirety with the same degree as the opposing-symmetrical partner flap. At high speeds, a part of the flap rotates or extends to a determinated angle by means of the actuator. The other part of the aileron, that is hinged or articulated to the main part of the aileron, rotates with reference to the main part as a function of the air speed pressure. Opposing this rotation are one or more springs.

The mechanical resistance of springs as required are exponential. However, the mechanical resistance may be linear or other desired so that the spring operates throughout the movement, or only in a low or high-speed zone.

The two-pieces ailerons use springs and adopt the form of a variable thickness aerodynamic profile.

The ailerons may be hollow or compacted, of variable cross-section, tapering toward the trailing edge. Both have an aerodynamic profile with hollow ailerons. Hot air can be made to flow through them to heat them. The flaps can include means to allow hot air to emerge through holes in the flaps surface.

When the flap is at high speed, dynamic air pressure causes the flaps to retract completely, so that together with the wing, the flaps form an aerodynamic profile.

The flaps may also be of rigid design. The rigid design contains flaps that are articulated to the wing and turn on a shaft. Springs or strips are used that control the flexibility of the flaps so that, the flaps are extended at low speed, and retracted at high speed.

The flaps size, whether of one or more elements, provides a large surface that allows for greater lift without the need for leading edge flaps.

Using rotating flaps around a tubular shaft, this is joined by means of a cardan to the shaft of the symmetrical flap to avoid asymmetry.

Provided that springs are close to the rotating shaft they provide its safe use.

An addition over-center spring can hold and fix the aileron.

Because this system acts automatically and with the use of only some springs, some devices and controls used to control the secondary or low speed surfaces are avoided.

A goal of the invention is to provide a sure, simple, and economical improvement to existing airplane flaps

DETAILED DESCRIPTION OF THE PREFERRED EMBODIMENTS

Figure 1:
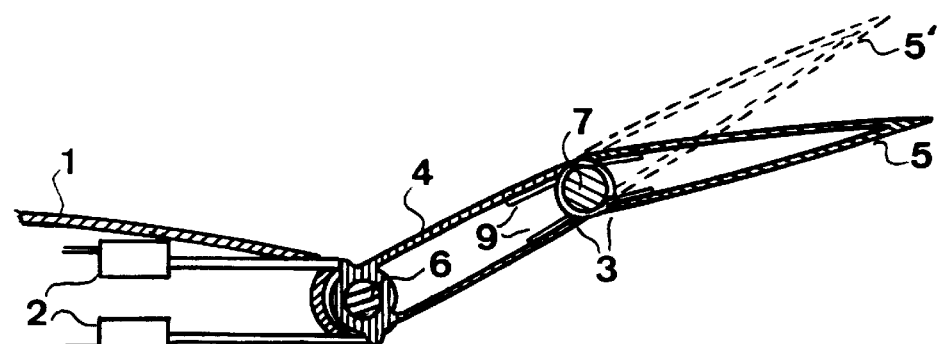
FIG. 1 shows a partial, side, and schematic cross-section view of the device of the invention with a rudder, elevator, or aileron.

FIG. 1 comprises a horizontal stabilizer 1 (also known as a wing), hydraulic actuators 2, a rudder or elevator 3 (also known as an aileron), the main part of the aileron, rudder 4 (also known as an elevator), the secondary part of the aileron at high speed 5, and at low speed 5', the rotary shafts 6 and 7, and the springs 9.

Figure 2:
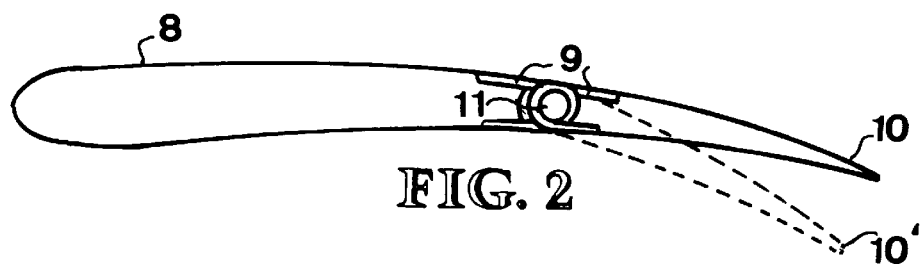
FIG. 2 shows a partial and schematic, cross-sectional view off a wing with an articulated flap using springs.

FIG. 2 comprises the wing 8, the springs 9, the flap at high speed 10 and at low speed 10', and the rotary shaft 11. In FIG. 2, the shaft is surrounded by a plurality of springs that act against the inside of the lower and an upper surfaces.

Figure 3:
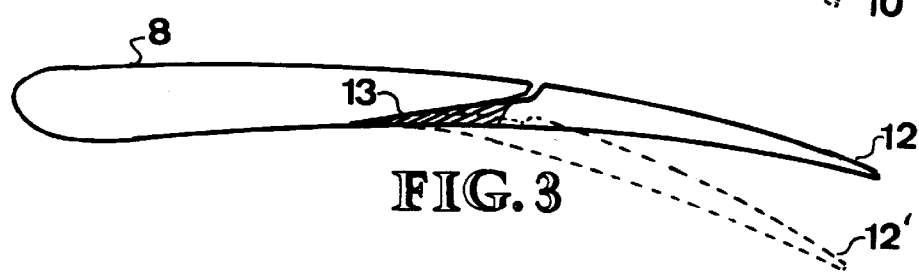
FIG. 3 shows a lateral, schematic cross-sectional view of a wing with an articulated flap using a strip type spring, along the union between the flap and the wing.

FIG. 3 comprises the wing 8, the flap at high speed 12 and at low-speed 12' and the strip 13. It has a strip on the lower zone between the wing and the flap and along its length.

Figure 4:
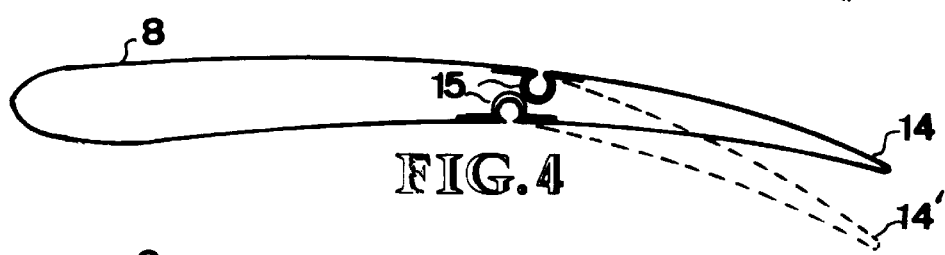
FIG. 4 shows a side, schematic, cross-sectional view of a wing with an articulated flap using one variant of springs: some springs inside the lower surface and the other inside the upper surface.

FIG. 4 comprises the wing 8, the flap at high-speed 14 and at low-speed 14', and the springs 15 inside the lower and upper surface. It has a plurality of springs between the wing and the flap.

Figure 5:
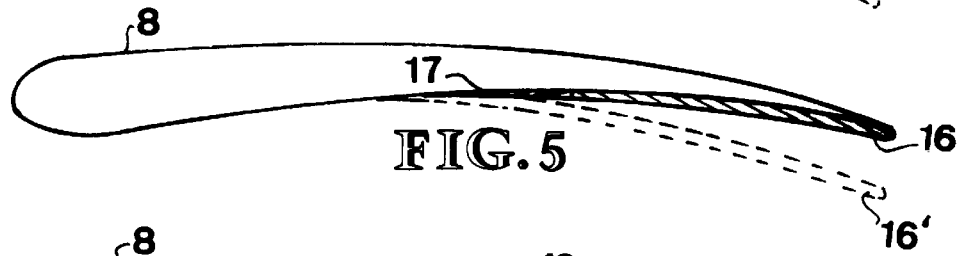
FIG. 5 shows a side, schematic, cross-section view of a wing with a rigid lower surface flap with a strip type spring fastened at a lower surface.

FIG. 5 comprises the wing 8, the flap at high speed 16, and at low-speed 16' and the strip 17. The flap uses an extended strip between the wing and the lower surface flap in its lower zone.

Figure 6:
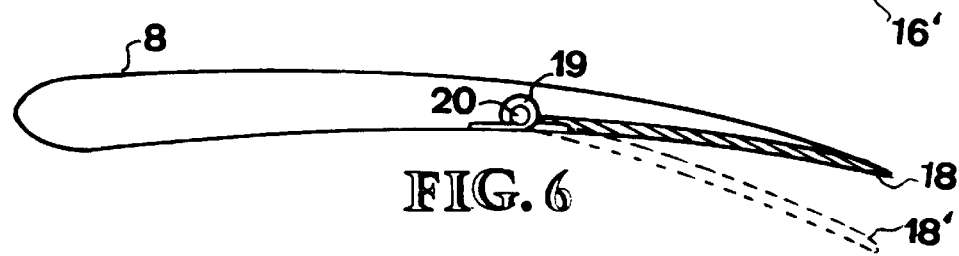
FIG. 6 shows a side, schematic, cross-section view of a wing with a rigid, hinged lower surface flap, using one variant of springs.

FIG. 6 comprises the wing 8, the flap at high-speed 18 and at low-speed 18', the spring 19, and its rotating shaft 20. The flap has a plurality of springs between the wing and the lower surface flap and around the rotating shaft.

What is claimed is:

1. Flight controls with automatic balance comprising: an aileron having a main part and an other part which at low speed adopts the shape of a conventional flight control surface and at high speeds, flexes to a position of least resistance with air speed pressure controlled by an actuator, and said other part is hinged to said main part of said flight control surface, whereby said other part rotates with reference to said main part as a function of air speed pressure incident on said other part; and at least one spring that opposes the rotation caused by said air speed pressure.

2. Flight controls with automatic balance according to claim 1, wherein mechanical resistance of said at least one spring is exponential.

3. Flight control with automatic balance according to claim 1, wherein said flight controls surface is attached to a wing and said flight control surface extends at low speed, and retracts at high speed without control by said actuator.

4. Flight controls with automatic balance according to claim 1, wherein said flight control surface rotates around a tubular shaft, that is joined by means of a cardan to said shaft which connects said flight control surface to said wing.

5. Flight controls with automatic balance comprising:

a flight control surface having a first part and a second part, which at low speed adopt the shape of a conventional flight control surface, such that said first and second parts rotate in their entirety as if a single part and at high speeds said first part rotates to a predetermined angle by means of an actuator connected to said first part, said second part of said flight control surface, hinged to said first part of said flight control surface, rotates with reference to said first part as a function of air speed pressure, and wherein said second part of said flight control surface opposes action of at least one spring that tends to maintain said first part and said second part of said flight control surface as if a single part.

6. Flight controls with automatic balance according to claim 5, wherein said flight control surface is hinged to a wing by a shaft surrounded by a plurality of springs that act against the inside of lower and upper surfaces of said wing and said flight control surface.

7. Flight controls with automatic balance according to claim 6, wherein an extended strip is between said wing and said flight control surface in a lower zone of said wing and said flight control surface.

8. Flight controls with automatic balance according to claim 6, wherein a plurality of springs are between said wing and the flight control surface wherein one or more of said springs are inside a lower surface of said flight control surface and said wing and one or more springs are inside an upper surface of said flight control surface and said wing.

9. Flight controls with automatic balance according to claim 6, wherein a plurality of springs are located between said wing and said flight control surface and the lower surface of said flight control surface, and around said shaft.

10. Flight controls with automatic balance according to claim 5, wherein said flight control surface is a flap.

11. Flight controls with automatic balance according to claim 5, wherein said flight control surface is a rudder.

12. Flight controls with automatic balance according to claim 5, wherein said flight control surface is an elevator.

13. Flight controls with automatic balance according to claim 5, wherein said flight control surface is an aileron.

\* \* \* \* \*